United States Patent
Chan

(10) Patent No.: US 9,568,345 B2
(45) Date of Patent: Feb. 14, 2017

(54) DUST MEASUREMENT SYSTEM FOR FILTER

(71) Applicant: HON HAI PRECISION INDUSTRY CO., LTD., New Taipei (TW)

(72) Inventor: Hung-Chou Chan, New Taipei (TW)

(73) Assignee: HON HAI PRECISION INDUSTRY CO., LTD., New Taipei (TW)

(*) Notice: Subject to any disclaimer, the term of this patent is extended or adjusted under 35 U.S.C. 154(b) by 329 days.

(21) Appl. No.: 13/949,268

(22) Filed: Jul. 24, 2013

(65) Prior Publication Data
US 2014/0318269 A1 Oct. 30, 2014

(30) Foreign Application Priority Data
Apr. 25, 2013 (TW) .............................. 102114815 A

(51) Int. Cl.
G01F 1/46 (2006.01)
G01P 5/16 (2006.01)

(52) U.S. Cl.
CPC .. G01F 1/46 (2013.01); G01P 5/16 (2013.01)

(58) Field of Classification Search
CPC .................................................... G01F 1/46
USPC ....... 73/861.65, 861.73, 861, 861.61, 861.52
See application file for complete search history.

(56) References Cited

U.S. PATENT DOCUMENTS

| | | | | |
|---|---|---|---|---|
| 7,255,013 B2* | 8/2007 | Urbahn | ...................... | G01F 1/46 73/861.65 |
| 7,669,485 B2* | 3/2010 | Tang | ...................... | G01F 15/063 73/861.79 |
| 2008/0053196 A1* | 3/2008 | Fraden | ...................... | G01F 1/46 73/31.04 |
| 2010/0319463 A1* | 12/2010 | Richardson | .......... | G01N 27/622 73/861.11 |
| 2012/0035866 A1* | 2/2012 | Qasimi | .................. | B01D 17/10 702/47 |
| 2014/0096618 A1* | 4/2014 | Ellison | ...................... | G01P 3/62 73/861.65 |

FOREIGN PATENT DOCUMENTS

| | | |
|---|---|---|
| CN | 202155121 U | 3/2012 |
| TW | I299080 B | 7/2008 |
| TW | 201001145 A | 1/2010 |

* cited by examiner

*Primary Examiner* — Michael A Lyons
*Assistant Examiner* — Hoang Nguyen
(74) *Attorney, Agent, or Firm* — Zhigang Ma

(57) ABSTRACT

A dust measurement system measuring the build up of dust on a filter includes a monitoring device, a pitot tube, and an environment control unit. The pitot tube head aligned with the filter. The environment control unit receives the measured speed of air flow and compares the measured speed with a preset value. When the measuring speed is greater than the preset value, the environment control unit outputs the first control signal to the monitoring device, to control the monitoring device to display that the filter does not need to be replaced. When the measuring speed is less than or equal to the preset value, the environment control unit outputs the second control signal to the monitoring device, to control the monitoring device to display that the filter needs to be replaced.

5 Claims, 3 Drawing Sheets

DUST MEASUREMENT SYSTEM FOR FILTER

BACKGROUND

1. Technical Field

The present disclosure relates to measurement systems, and particularly to a measurement system for measuring dust build up of a filter.

2. Description of Related Art

Containerized data center is a large centralized computing facility, which includes a container and a plurality of data processing devices arranged in the container. However, the data processing devices produce a lot of heat during operation, so, cooling solutions for the containerized data center becomes very important. In general, some air vents are defined in the container for dissipating heat, and filters are set in the air vents for preventing dust from entering the container. However, air flow may be prevented when there is a build up of dust on the filter. Therefore, there is room for improvement in the art.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the present embodiments. Moreover, in the drawing, like reference numerals designate corresponding parts throughout the several views.

DETAILED DESCRIPTION

The disclosure, including the drawings, is illustrated by way of example and not by way of limitation. References to "an" or "one" embodiment in this disclosure are not necessarily to the same embodiment, and such references mean "at least one".

Figure 1:
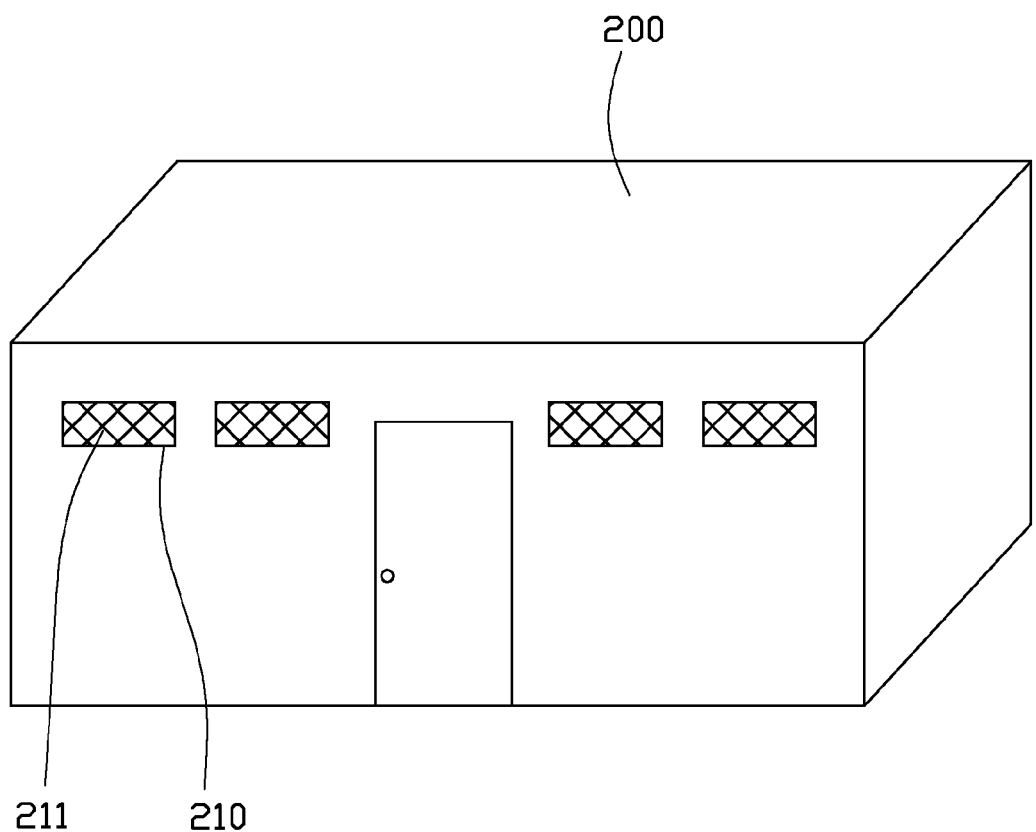
FIG. 1 is a schematic view of a dust measurement system for a filter in accordance with an embodiment of the present disclosure.
Figure 2:
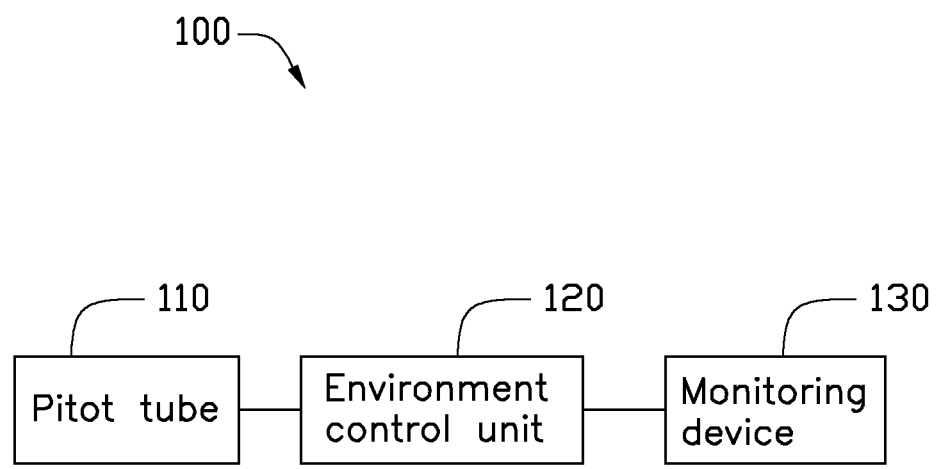
FIG. 2 is a block diagram of the dust measurement system of FIG. 1, wherein the dust measurement system includes a pitot tube.
Figure 3:
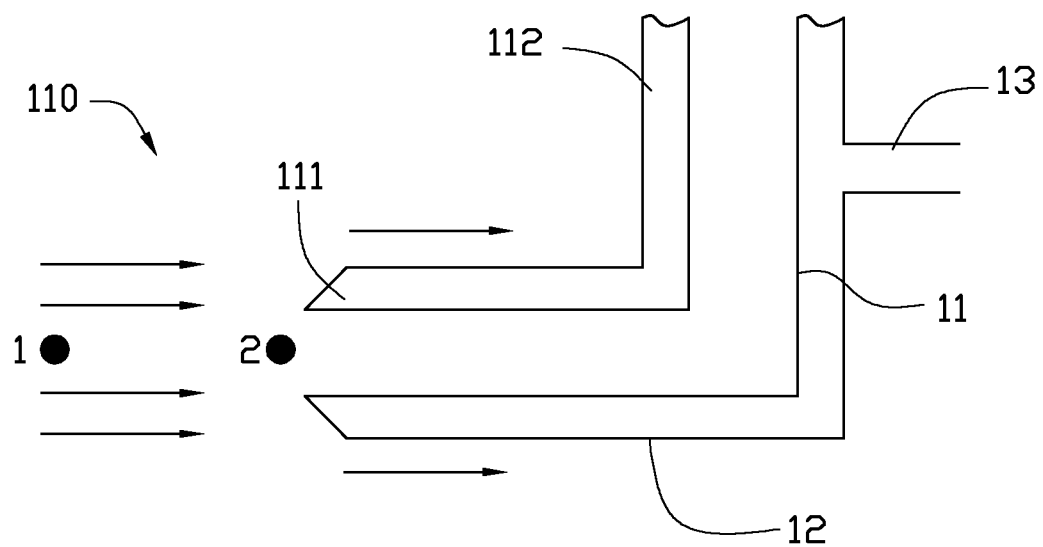
FIG. 3 is a schematic view of the pitot tube of FIG. 2.

FIGS. 1 to 3 show a dust measurement system 100 for a filter 211 in accordance with an embodiment. The dust measurement system 100 is arranged in a container 200 of a container data center, to automatically measure dust build up on the filter 211 mounted in an air vent 210 of the container 200. The dust measurement system 100 includes a pitot tube 110, an environment control unit 120, and a monitoring device 130.

The pitot tube 110 is arranged in the container 200. A head 111 of the pitot tube 110 faces an air flow, flowing through the air vent 210 and aligned with the filter 211, to measure a speed of the air flow passing through the filter 211 and transmit the measured speed to the environment control unit 120. The environment control unit 120 compares the measured speed with a preset value stored in the environment control unit 120 and outputs a first control signal or a second control signal to the monitoring device 130, to control the monitoring device 130 to display that the filter 211 needs to be replaced or not. In one embodiment, the preset value is a speed of air flow when the filter 211 needs to be replaced. When the measured speed is greater than the preset value, the environment control unit 120 outputs the first control signal to the monitoring device 130, and the monitoring device 130 displays that the filter 211 does not need to be replaced. When the measured speed is less than or equal to the preset value, the environment control unit 120 outputs the second control signal to the monitoring device 130, and the monitoring device 130 displays that the filter 211 needs to be replaced. In one embodiment, the environment control unit 120 transmits the first control signal or the second control signal to the monitoring device 130 through a wired network. In other embodiments, the environment control unit 120 transmits the first control signal or the second control signal to the monitoring device 130 through a wireless network. In one embodiment, the monitoring device 130 may be a remote monitoring device.

The pitot tube 110 includes an inner tube 11 and an outer tube 12 fitting about the inner tube 11. A side tube 13 is extended from a sidewall of the outer tube 12, communicating with an inner space of the outer tube 12. The pitot tube 110 obtains the speed of the air flow through a pressure difference between the inner tube 11 and the outer tube 12. In one embodiment, measuring points 1 and 2 are selected as example. A rear end 112 of the pitot tube 110 is connected to the environment control unit 120, for outputting the measured speed of the air flow to the environment control unit 120. Because the head 111 of the pitot tube 110 has a retention point, a speed V2 of air flow at the measuring point 2 which is located at the head 111 is equal to zero, namely, V2=0. An elevation (which is an absolute distance from a point to a base plane along in a vertical direction) Z1 at the measuring point 1 is equal to an elevation Z2 at the measuring point 2, namely, Z1=Z2. A pressure P2 at the measuring point 2 includes a velocity head (which is a ratio between the square of the fluid velocity and two times the acceleration due to gravity) and a pressure head (which is a ratio between a pressure per unit area and weight per unit volume). A pressure P1 at the measuring point 1 includes a pressure head. Therefore, the pressure P1 is less than the pressure P2.

According to the following $$\frac{P1}{ra} + Z1 + \frac{V1*V1}{2g} = \frac{P2}{ra} + Z2 + \frac{V2*V2}{2g}, \qquad \text{formula (1)}$$

where P1 stands for the pressure at the measuring point 1, Z1 stands for the elevation of the measuring point 1, V1 stands for the speed of air flow at the measuring point 1, P2 stands for the pressure at the measuring point 2, Z2 stands for the elevation of the measuring point 2, V2 stands for the speed of air flow at the measuring point 2, g is an gravity acceleration, and ra is air ratio weight.

The following $$\frac{V1*V1}{2g} = \frac{P2}{ra} - \frac{P1}{ra} \qquad \text{formula (2)}$$

and $$\Delta P = P2 - P1 \qquad \text{formula (3)}$$

can be obtained according to V2=0, Z1=Z2, and the formula (1). Wherein $\Delta P$ is a difference between the pressure P1 and P2. The speed V1 of air flow at the measuring point 1 is equal to $$\sqrt{2g\Delta P}\big/\sqrt{ra},$$

namely, $$V1 = \sqrt{2g\Delta P}\big/\sqrt{ra}.$$

The environment control unit 120 compares the speed V1 received from the pitot tube 110 with the preset value and outputs the first control signal to the monitoring device 130 when the speed V1 is greater than the preset value, to control the monitoring device 130 to display that the filter 211 does not need to be replaced. The environment control unit 120 outputs the second control signal to the monitoring device 130 when the speed V1 is less than or equal to the preset value, to control the monitoring device 130 to display that the filter 211 needs to be replaced.

The dust measurement system 100 can measure the speed of air flow through the pitot tube 110 and compare the measured speed with the preset value through the environment control unit 120, to control the monitoring device 130 to display that the filter 211 needs to be replaced or not.

Even though numerous characteristics and advantages of the disclosure have been set forth in the foregoing description, together with details of the structure and function of the disclosure, the disclosure is illustrative only, and changes may be made in detail, especially in matters of shape, size, and the arrangement of parts within the principles of the disclosure to the full extent indicated by the broad general meaning of the terms in which the appended claims are expressed.

What is claimed is:

1. A dust measurement system applicable to measure dust built up on a filter, comprising:
    a monitoring device;
    a head of a pitot tube aligned with the filter, wherein the head of the pitot tube faces an orientation of air flow for measuring a speed of air flow passing through the filter, the pitot tube outputs the measured speed of air flow;
    an environment control unit to receive the measured speed of air flow and compare the measured speed with a preset value, which is a speed of air flow when the filter needs to be replaced, and output a first control signal or a second control signal to the monitoring device according to a compared result; and
    a rear end of the pitot tube connected to the environment control unit, for outputting the measured speed of the air flow to the environment control unit;
    wherein when the measured speed is greater than the preset value, the environment control unit outputs the first control signal to the monitoring device, to control the monitoring device to display that the filter does not need to be replaced; when the measured speed is less than or equal to the preset value, the environment control unit outputs the second control signal to the monitoring device, to control the monitoring device to display that the filter needs to be replaced.

2. The dust measurement system of claim 1, wherein the environment control unit outputs the first control signal or the second control signal to the monitoring device through a wired network.

3. The dust measurement system of claim 1, wherein the environment control unit outputs the first control signal or the second control signal to the monitoring device through a wireless network.

4. The dust measurement system of claim 3, wherein the monitoring device is a remote monitoring device.

5. The dust measurement system of claim 1, wherein the pitot tube includes an inner tube, an outer tube fitting about the inner tube, and a side tube extended from a sidewall of the outer tube to communicate with an inner space of the outer tube.

* * * * *